United States Patent
King et al.

(10) Patent No.: US 9,931,574 B2
(45) Date of Patent: Apr. 3, 2018

(54) LEADERSHIP ROLE PLAYING GAME AND METHOD THEREFOR

(71) Applicant: Branch Banking and Trust Company, Winston Salem, NC (US)

(72) Inventors: Kelly King, Winston Salem, NC (US); David J. Ballard, Austin, TX (US); Michael M. Hall, Austin, TX (US); Chance D. Ivey, Austin, TX (US); Matthew J. Sanders, Austin, TX (US)

(73) Assignees: Branch Banking and Trust Company, Raleigh, NC (US); Chaotic Moon, LLC, Austin, TX (US)

( * ) Notice: Subject to any disclaimer, the term of this patent is extended or adjusted under 35 U.S.C. 154(b) by 514 days.

(21) Appl. No.: 14/657,493

(22) Filed: Mar. 13, 2015

(65) Prior Publication Data

US 2015/0258454 A1 Sep. 17, 2015

Related U.S. Application Data

(60) Provisional application No. 61/952,612, filed on Mar. 13, 2014.

(51) Int. Cl.
*A63F 13/47* (2014.01)
*A63F 13/822* (2014.01)

(52) U.S. Cl.
CPC ............ *A63F 13/822* (2014.09); *A63F 13/47* (2014.09)

(58) Field of Classification Search
None
See application file for complete search history.

(56) References Cited

U.S. PATENT DOCUMENTS

| | | | | |
|---|---|---|---|---|
| 5,393,071 A | * | 2/1995 | Best .................. | A63F 13/005 463/1 |
| 8,328,643 B1 | * | 12/2012 | Osvald ............... | G06Q 10/101 434/107 |
| 2011/0320965 A1 | * | 12/2011 | Hairman ............. | A63F 13/47 715/757 |

* cited by examiner

*Primary Examiner* — Damon Pierce
(74) *Attorney, Agent, or Firm* — Duane Morris LLP

(57) ABSTRACT

The present disclosure describes novel systems and methods for teaching and exercising leadership skills and strategies including the use of a narrative-driven role playing game.

60 Claims, 10 Drawing Sheets

LEADERSHIP ROLE PLAYING GAME AND METHOD THEREFOR

RELATED AND CO-PENDING APPLICATIONS

This application claims priority to U.S. provisional application entitled "Leadership RPG Game and Method", Ser. No. 61/952,612 filed 13 Mar. 2014, the entirety of which is hereby incorporated herein by reference.

BACKGROUND

The vital role leadership plays in today's complex society cannot be underemphasized. Tomorrow's leaders need to learn and retain the knowledge and skills required of a leader in an efficient and effective manner so that they are able to step into and assume leadership positions in all phases of society.

Current systems and methods for effectively teaching leadership skills are typically limited to listening to lectures, reading case studies about the exploits of well-known leaders, and perhaps participating in an exercise designed to allow the leadership student to apply his or her knowledge and/or conceptions of leadership skills in a controlled environment. While these methods may have some merit, they also have a number of shortcomings including keeping the attention of the leadership students, not allowing for a fun and engaging experience to bolster interest in the subject matter being taught, and lacking the capacity for reinforcing the lessons presented by the learning material with quick and direct feedback to choices made by a leadership student.

Accordingly, there is a need for a novel system and method to facilitate the learning of leadership skills for those who will become tomorrow's leaders in society, business, and other endeavors. In an embodiment, a computer-implemented method for a narrative-driven role playing game is described, the method including providing, by a game engine, a plurality of zones wherein a first one of the plural zones includes a first non-player character ("NPC") for interacting with a player character ("Character") controlled by a player, and wherein the first zone includes one or more first quests at least one of which is locked and not initially selectable by the player, and wherein the completion of a predetermined one or ones of the one or more first quests allows for the Character to proceed to a second one of the plurality of zones; providing, via the game engine, an entry of the Character into the first zone; selecting, by the player via the game engine, a first one of the one or more non-locked first quests; and placing the Character, via the game engine, in the selected first quest.

The embodiment further provides for interacting, by the player via the game engine, in the selected first quest with the first NPC in a first set of narrative-driven dialogs each having a branching dialog tree, wherein a first dialog of the first set of dialogs includes a predetermined initial input by the first NPC and a first plurality of predetermined response options presented to the player, wherein the player selects one of the first predetermined response options, and wherein a second dialog of the first set of dialogs includes a second input by the first NPC based on the first predetermined response option selected by the player in the first dialog of the first set of dialogs; attaining one of a predetermined number of first outcomes based on one or more responses selected by the player in the first set of narrative-driven dialogs; determining, via the game engine, a first quest score for the selected first quest wherein the first quest score is based on the first outcome attained; placing the Character, via the game engine, into the first zone; displaying to the player, via the game engine, an effect to the first zone based on the attained first outcome wherein the effect includes unlocking a locked first quest; selecting, by the player via the game engine, a second one of the one or more non-locked first quests; placing the Character, via the game engine, into a second one of the plural zones upon the player's completion of the predetermined one or ones of the one or more first quests; determining, via the game engine, an aggregate score for the player based on completed selected first quests; and displaying, to the player, an indication of the aggregate score.

In another embodiment, the computer-implemented method for a narrative-driven role playing game may be stored on a non-transitory machine-readable medium in the form of a plurality of executable instructions.

According to yet another embodiment, a computer-implemented method for a narrative-driven role playing game is provided to teach and/or reinforce leadership training, aspects, and strategies to a player, the method including providing, by a game engine, a plurality of zones wherein a first one of the plural zones includes a first non-player character ("NPC") for interacting with a player character ("Character") controlled by a player, and wherein the first zone includes one or more first quests at least one of which is locked and not initially selectable by the player, and wherein the completion of a predetermined one or ones of the one or more first quests allows for the Character to proceed to a second one of the plurality of zones, and wherein the second one of the plural zones includes a second NPC for interacting with the Character controlled by the player, and wherein the second zone includes one or more second quests at least one of which is locked and not initially selectable by the player, and wherein the completion of a predetermined one or ones of the one or more second quests allows for the Character to proceed to a third one of the plurality of zones; providing, via the game engine, an entry of the Character into the first zone; selecting, by the player via the game engine, a first one of the one or more non-locked first quests; and placing the Character via the game engine, in the selected first quest.

The embodiment further provides for interacting, by the player via the game engine, in the selected first quest with the first NPC in a first set of narrative-driven dialogs each having a branching dialog tree, wherein a first dialog of the first set of dialogs includes a predetermined initial input by the first NPC and a first plurality of predetermined response options presented to the player wherein the first plurality of predetermined response options include a praise response, a coach response, and a scold response, wherein the player selects one of the first predetermined response options, and wherein a second dialog of the first set of dialogs includes a second input by the first NPC based on the first predetermined response option selected by the player in the first dialog of the first set of dialogs; attaining one of a predetermined number of first outcomes based on one or more responses selected by the player in the first set of narrative-driven dialogs, wherein one of the branching dialog trees in the first set of narrative-driven dialogs includes a first path having a first number of NPC interactions for attaining a first of the predetermined number of outcomes and a second path having a second number of NPC interactions for attaining the first of the predetermined number of outcomes; and determining, via the game engine, a first quest score for the selected first quest wherein the first quest score is based on the first outcome attained.

The embodiment further provides for placing the Character, via the game engine, into the first zone; displaying to the player, via the game engine, an effect to the first zone based on the attained first outcome wherein the effect includes unlocking a locked first quest; selecting, by the player via the game engine, a second one of the one or more non-locked first quests; placing the Character, via the game engine, into a second one of the plural zones upon the player's completion of the predetermined one or ones of the one or more first quests; determining, via the game engine, an aggregate score for the player based on completed selected first quests; displaying, to the player, an indication of the aggregate score; unlocking, via the game engine, a game feature if the aggregate score is greater than a predetermined threshold; selecting, by the player via the game engine, a first one of the one or more non-locked second quests; and placing the Character, via the game engine, in the selected second quest.

The embodiment further provides for interacting, by the player via the game engine, in the selected second quest with the second NPC in a second set of narrative-driven dialogs each having a branching dialog tree, wherein a first dialog of the second set of dialogs includes a predetermined initial input by the second NPC and a second plurality of predetermined response options presented to the player wherein the second plurality of predetermined response options include a praise response, a coach response, and a scold response, wherein the player selects one of the second predetermined response options, and wherein a second dialog of the second set of dialogs includes a second input by the second NPC based on the second predetermined response option selected by the player in the first dialog of the second set of dialogs; attaining one of a predetermined number of second outcomes based on one or more responses selected by the player in the second set of narrative-driven dialogs; and determining, via the game engine, a score for the selected second quest wherein the score is based on the second outcome attained.

The embodiment further provides for placing the Character, via the game engine, into the second zone; displaying to the player, via the game engine, an effect to the second zone based on the attained second outcome wherein the effect includes unlocking a locked second quest; selecting, by the player via the game engine, a second one of the one or more non-locked second quests; placing the Character, via the game engine, into a third one of the plural zones upon the player's completion of the predetermined one or ones of the one or more second quests; determining, via the game engine, an updated aggregate score for the player based on completed selected first and second quests; and displaying, to the player, an indication of the updated aggregate score.

In still another embodiment, the computer-implemented method for a narrative-driven role playing game which is provided to teach and/or reinforce leadership training, aspects, and strategies to a player may be stored on a non-transitory machine-readable medium in the form of a plurality of executable instructions.

DETAILED DESCRIPTION

Figure 1:
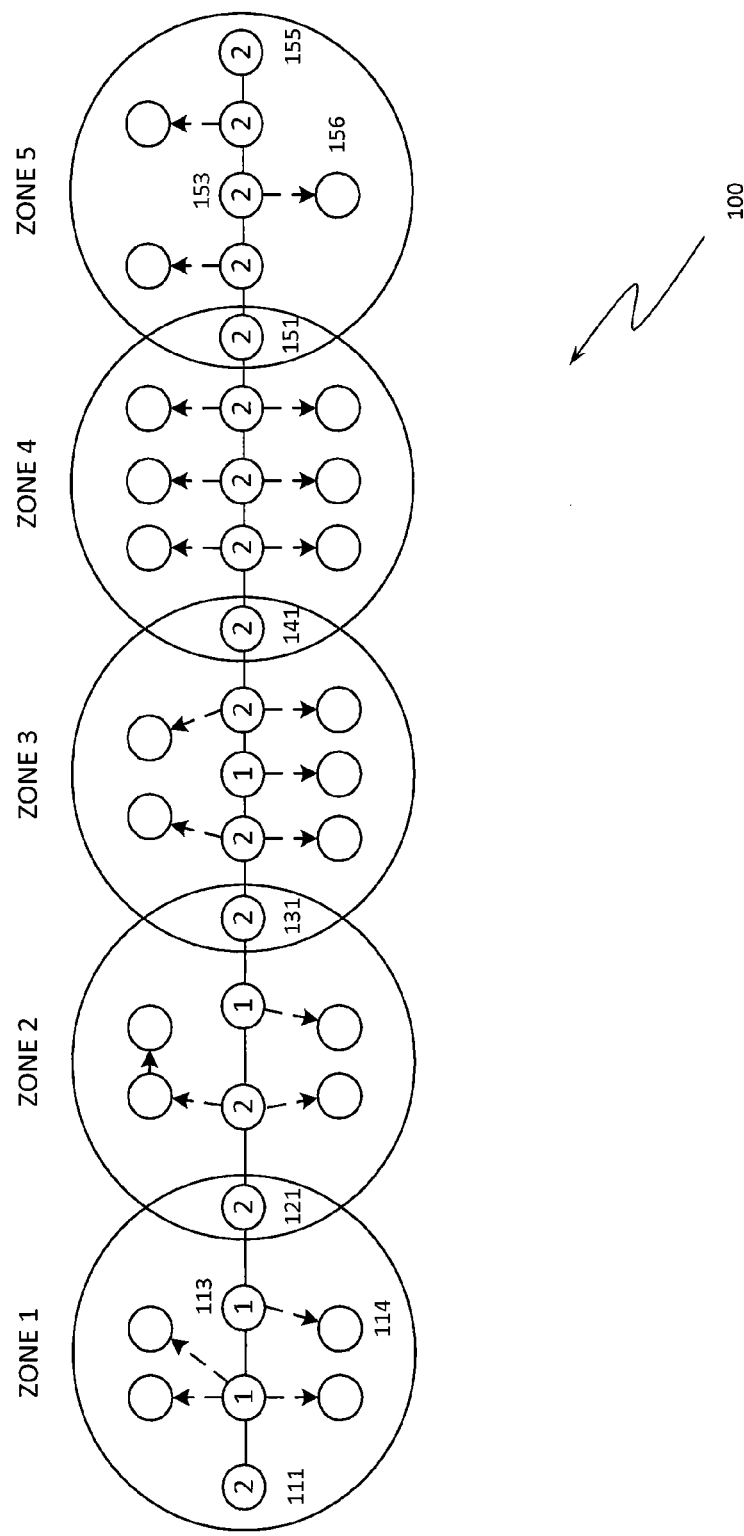
FIG. 1 is an exemplary overall map schematic for a narrative-driven role playing game for teaching leadership skills according to an embodiment of the present subject matter.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that for some embodiments, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus, the following description is provided as illustrative of the principles of the present subject matter and not in limitation thereof and may include modification thereto and permutations thereof. While the following exemplary discussion of the present subject matter may be directed towards or reference specific embodiments, it is to be understood that the discussion is not intended to limit the scope of those embodiments.

Those skilled in the art will further appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto.

With reference to the figures where like elements have been given like numerical designations to facilitate an understanding of the present subject matter, various embodiments of a system and method for a role-playing game to teach and reinforce lessons and aspects of leadership are described.

The present disclosure describes novel systems and methods for teaching and exercising leadership skills and strategies. The quality of leadership has a major impact on the success of any endeavor and any organization. The best leaders are able to create a common sense of purpose in their team. They develop strategies for the implementation of the purpose. The leader then teaches and/or coaches their teammates on how to execute the developed strategies. Additionally, the leader creates the optimal context, the value system, in which the team members can achieve the mutually agreed upon objectives and be personally fulfilled in the process.

While some people view leadership as a mystical ability bestowed upon a chosen few, the reality is that there is both an artistic aspect and a scientific aspect to leadership. The artistic aspect requires a high level of subconscious integrations by the leader based on, for example, their life experiences. Some individuals have a natural ability to conceptualize these experiences into a very useful set of "intuitive" responses to become a successful leader. However, the scientific aspect of leadership is more important and, significantly, is learnable. The fundamental concept underlying the leadership process is that beliefs produce behaviors which produce results. Therefore, leaders must instill the correct set of beliefs and insure that those beliefs are reinforced with the correct behaviors thereby creating superior results. Thus, leadership skills and strategies can be trained and developed through teaching, coaching, positive reinforcement, and repetition.

The principles of successful leadership are generally straightforward although the execution of leadership skills and strategies can be difficult. According to one leadership model, people behave on a long-term basis in a manner that is consistent with their personality, the primary components of which are beliefs, emotions, and behaviors. Beliefs influence emotions which influence behaviors and the right behaviors create the best results for the leader, the follower, and the team as a unit. Those behaviors, in turn, influence one's beliefs. Therefore, positive reinforcement of any and/or all of these aspects will result in the betterment of one's leadership skills and ability.

In an embodiment, leadership skills and strategy are taught and reinforced by use of a narrative-driven role playing game where the leadership student/game player is taught leadership skills through meaningful interactions with non-player characters. The player will journey through a realm having various NPC story zones some or all of which will have multiple branching dialog sequences. Depending on how well the player performs in the NPC interactions, the game world will grow thereby opening up new quest opportunities for the player and gaining favor with the overall ruler of the realm.

In a particular embodiment, the game will take the player on a journey beginning as a fledgling settler to the ruler of a great city. The player will begin in a small, leaderless, village and through NPC interactions the player will rise to a position of leadership and influence based on the choices made by the player during the NPC interactions. The NPC interactions are designed to teach leadership skills and will present the player with various scenarios during which the player can choose one of several responses in a dialog with the NPC in that scenario. In a further embodiment, the responses to choose from may be characterized as a praise response, a coach response, and a scold response ("PCS"). The NPC will react depending on the particular response chosen. Leadership points may be awarded to the player depending on the chosen responses. In an embodiment, the points awarded may change from dialog to dialog such that always choosing, for example, a praise response may not maximize the number of leadership points awarded. A Leadership Indicator may be displayed so that the player can view his or her progress and/or points awarded.

Additionally, the play of the game will also be influenced by the particular response chosen. In a given scenario, there may be more than one interaction between the player and the NPC where each interaction opportunity allows the player to choose a response from a given set of possible responses. Positive and/or negative feedback may be given to the player depending on the response choices made and the type of feedback given may also have an impact on the game world. For example, positive feedback will sustain over time whereas negative feedback may produce quick results for the problem at hand, but will be unsustainable in the long run.

Background narratives will be provided for several of the key NPC advisors in the game who manage the resources in the scenarios. These background narratives will assist the player in understanding the NPC's beliefs and thereby enabling the player to use this knowledge to adapt his leadership skills and strategy accordingly. In other aspects of certain embodiments, the game will provide a location accessible by the player within which the player will be able to read or listen to material discussing leadership lessons applicable to the player's current quest. Portions of the leadership material may be locked until the player has achieved certain predefined goals within the game.

Furthermore, certain embodiments include a review of the player's progress by the ruler of the realm (a NPC). The ruler may choose, based on the player's performance in the game to that point, to coach the player and/or provide guidance on leadership decision-making or how to approach a particular in-game problem. Thus, the ruler's feedback manages the player who manages the NPCs in the various game scenarios thereby creating a feedback loop. A leadership meter may be provided to indicate how well the player is leading the NPCs.

In other embodiments, secondary gameplay may provide the player with mini-games designed to provide small boosts to the resources of a population area (village, town, city, region, kingdom, etc.) and may or may not provide a boost to the player's leadership score.

Upon completion of certain quests and scenarios, the player will reach the end of the game and may be awarded a token on a Leaderboard to signify the level of leadership skills exhibited during the game. In an embodiment, the Leaderboard may be sharable with other players. Since each player's final score is based on the player's experiences and reactions chosen during the game, and since there are multiple branching dialog sequences, the player will be enticed to play the game numerous times to maximize his or her final score. In a further embodiment, an animation replay will allow the player to view key decisions made throughout the game so that the player can choose a new strategy the next time through. In yet a further embodiment, a player may opt to choose a character with one of a preselected specific leadership profile so that the character's tendencies must be taken into account during NPC interactions.

In a particular embodiment, the player must apply the concepts of a leadership methodology in interacting with NPCs (i.e., PCS events) to determine how well the current population area performs which will factor into the player's leadership score. The overall game may include multiple story zones each with its own specific NPC with which the player will interact while in that zone. Each zone will have multiple PCS events and one or more side quests or mini-games. For each of these PCS events and/or side quests, the player's character in the game may typically be placed in a separate scenario and/or map from the overall game map. For each PCS event, there will be an introduction to the dialog for the player and during the interaction with the NPC, the player will be presented with two or more options for responding. The player must choose what he/she determines to be the most appropriate response. Each PCS event will require multiple dialog responses, so to optimize his/her score the player must succeed multiple times. Branching dialog flow allows the player to reach a particular outcome (i.e., the end of the PCS event) via different paths where each path may have a different number of NPC interactions/dialogs. Each PCS event may have multiple outcomes, such as one or more of a praise outcome, a coach outcome, or a scold outcome. Each of the outcomes has a score value associated with it where the particular score for an outcome depends on the PCS event and may be predetermined. For example, a particular PCS event may have a coach outcome for which the player is awarded two points, a scold outcome for which the player is awarded one point, and a praise outcome for which the player is awarded zero points. Another PCS event may award the player two points for reaching the praise outcome, one point for reaching the scold outcome, and zero points for reaching the coach outcome. In another embodiment, the points awarded for any two outcomes may be the same. A content of a subsequent dialog presented to the player by the NPC will depend on the player's chosen response to the previous dialog within the PCS event. As PCS events are completed, new quests will become available, some may be secondary quests and some may be primary quests (i.e., PCS events). Each of the primary quests must be completed for the player to advance to the next story zone. Some secondary quests may be pass/fail or yes/no events.

In an embodiment, an exemplary flow of events in a narrative-driven role playing game as described herein may proceed as follows, where those of skill in the art will readily understand that this is not the only possible flow of events. The player's character is placed on the game map; the player undertakes a quest (typically the player chooses amongst available quests) in which the player's character is taken from the map and placed in a situation set-up scenario where a NPC begins a dialog and a PCS event or pass/fail or yes/no event is undertaken (if so chosen by the player); the player enters responses to the NPC's questions/dialog inputs; an outcome is reached to the event; the player's score is computed based on the player's responses; the outcome of the event is displayed to the player; the game map is updated, if applicable (e.g., based on the outcome attained, a new area/level/zone may be unlocked and available to the player); and the player's character is again placed on the game map.

In an embodiment, for each PCS event, pass/fail, or yes/no event the player is awarded a quantifiable amount of points (as discussed above), which may be referred to as Leadership Influence ("LI"). In a particular embodiment, LI points are not lost once they are awarded and a State of the Kingdom metric may be determined and may be based on the ratio of LI points awarded to the total amount of LI points possible (or on a percentage basis). In a further particular embodiment, the State of the Kingdom may be based on the LI ratio and/or percentage metric such as: 0-20% is "unrest"; 20-40% is "sad", 40-60% is "neutral"; 60-80% is "happy"; and 80-100% is "ecstatic". Those of skill in the art will readily understand that the aforementioned figures are exemplary only. Unlockable character buffs may also be awarded, to be used at the player's discretion, based on the State of the Kingdom metric. Exemplary buffs may include: removing the worst answer from possible answers for the player to choose from in PCS events; automatically selecting the correct/best answer; and an automatic return to the game map. In some embodiment, LI points are only awarded for primary quests (i.e., PCS events).

With attention drawn to FIG. 1, an exemplary overall map schematic 100 is presented according to an embodiment of the present subject matter. In this particular embodiment, there are five "zones" through which the player must proceed to get from the starting point 111 to the finishing point 155. In an exemplary embodiment, these zones may correspond to the size of a settlement that the player has a leadership role over, such as a village, town, city, region, and kingdom, respectively. While in each particular zone, the player may interact with a specific NPC for that zone. Additionally, the PCS events and/or side quests may become increasingly more difficult as the zone numbers increase. Typically, at the beginning of a game, only a portion of Zone 1 is visible to the player. For example, in an embodiment, only PCS event 111 may be initially visible to the player.

In the exemplary embodiment displayed in FIG. 1, the PCS events are placed along the horizontal line and are annotated with a number of LI points available for that particular PCS event. For example, PCS event 111 is worth a maximum of 2 points and side quest 114 is worth no LI points (although completing the side quest may result in useful information being imparted to the player). In other embodiments, the side quests may include LI points. The side quests may be hidden from the player until the player successfully completes the previously-adjoining PCS event or side quest (as shown by the dotted line arrows in FIG. 1). For example, in Zone 5, side quest 156 may not be visible to the player until PCS event 153 has been successfully completed, i.e., the player finishes all of the dialog events for PCS event 153. It is contemplated in some embodiments that the player need not attain a score of 2 LI points in PCS event 153 in order to have the game reveal side quest 156.

PCS events 121, 131, 141, and 151 are shared between two zones and upon completion of, for example, PCS event 121 portions or all of Zone 2 may become visible to the player.

Figure 2:
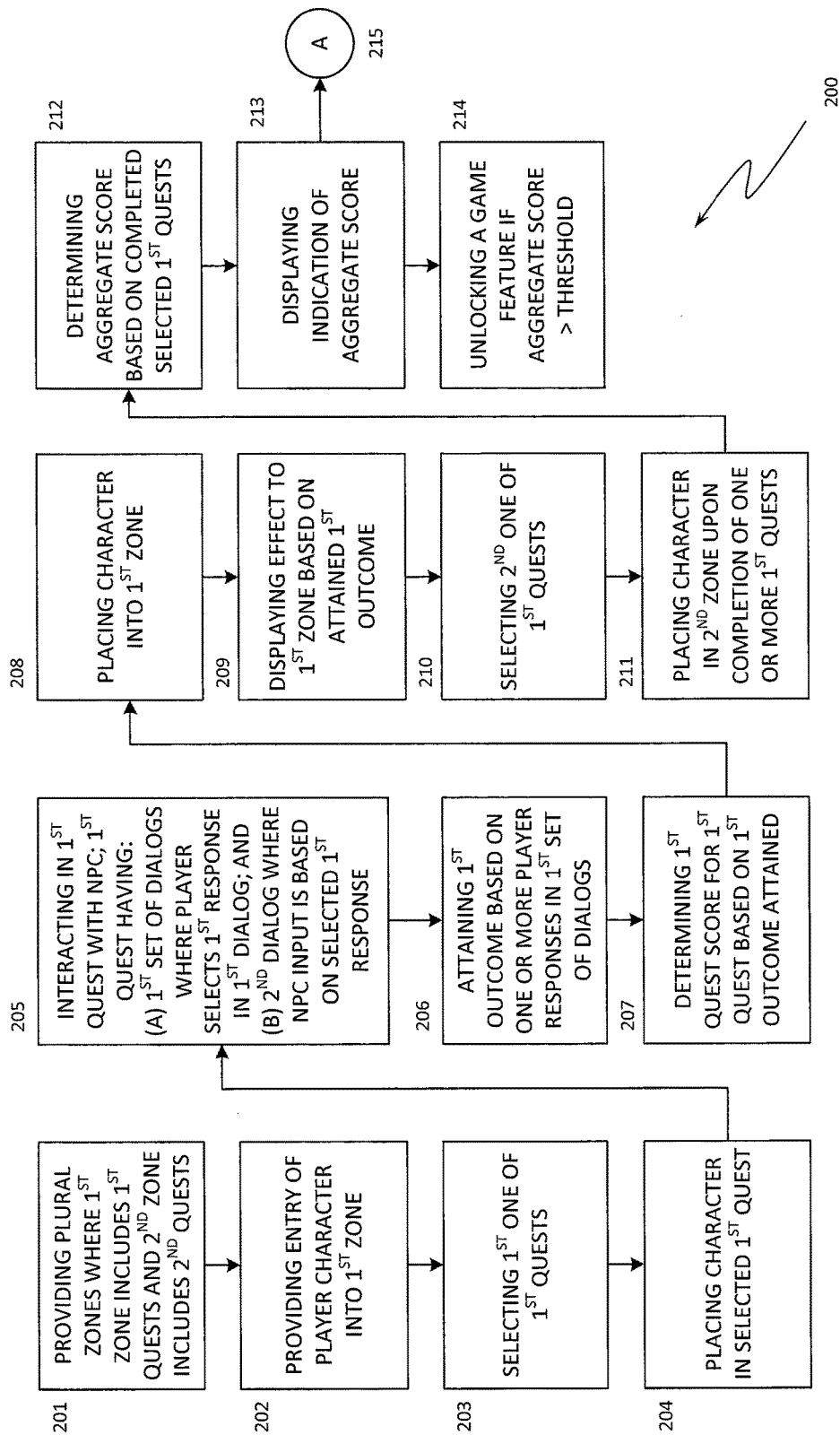
FIG. 2 is a computer-implemented method for a narrative-driven role playing game for teaching leadership skills according to an embodiment of the present subject matter.

Now turning to FIG. 2, a computer-implemented method 200 for a narrative-driven role playing game for teaching leadership skills is presented. Likewise, FIG. 2 may represent executable instructions for a narrative-driven role playing game for teaching leadership skills where the executable instructions may be stored on a non-transitory machine-readable medium.

At block 201 a game engine may provide multiple zones where a first zone includes a first non-player character ("NPC") for interacting with a player character ("Character") controlled by a player of the narrative-driven role playing game, and where the first zone includes one or more first quests, such as a PCS event and/or a side quest, such as a pass/fail or yes/no event. At least one of the first quests is locked and not initially selectable by the player. Upon the player's completion of a predetermined one or ones of the first quests allows for the Character to proceed to a second one of the zones.

At block 202, the Character is entered, via the game engine, into the first zone. At block 203, the player selects a first one of non-locked first quests. At block 204, the Character, via the game engine, is placed in the selected first quest. At block 205, the player interacts in the selected first quest with the first NPC in a first set of narrative-driven dialogs. At least one of the first set of narrative-driven dialogs comprises a scenario/interaction which provides leadership training or leadership skills development for the player. In an embodiment, each of the narrative-driven dialogs has a branching dialog tree. A first dialog of the first set of dialogs is presented to the player and includes a predetermined initial input by the first NPC and a first set of predetermined response options. In an embodiment, the first set of predetermined response options equals three. In a further embodiment, the response options include a praise response, a coach response, and a scold response. The player selects one of the first predetermined response options and, based on the first predetermined response option selected by the player in the first dialog, a second dialog of the first set of dialogs is presented to the player. The second dialog includes a second input by the first NPC.

At block 206, the player navigates through the various narrative-driven dialogs until he/she attains one of a predetermined number of first outcomes. In an embodiment, the number of first outcomes equals three. The outcome attained by the player is based on one or more responses selected by the player in the first set of narrative-driven dialogs. At block 207, the game engine determines a first quest score for the selected first quest where the first quest score is based on the first outcome attained. In an embodiment, the first quest score is a first predetermined score awarded to the player if the player attains a first one of the first outcomes, a second predetermined score if the player attains a second one of the first outcomes, or a third predetermined score if the player attains a third one of the first outcomes. In a further embodiment, the first, second, and third predetermined scores are different. In a still further embodiment, two of the first, second, and third predetermined scores are the same. In yet a further embodiment, the score awarded to the player depends on the path the player took through the narrative-driven branching dialog tree. In still yet a further embodiment, at least one of the first, second, and third predetermined scores is independent of the path the player took through the branching dialog tree. It is also contemplated by the present disclosure that one or more of the first quests is a non-scoring quest.

In an embodiment, one of the branching dialog trees in the first set of narrative-driven dialogs includes a first path having a first number of NPC interactions for attaining a first of the predetermined number of outcomes and a second path having a second number of NPC interactions for attaining the first of the predetermined number of outcomes.

At block 208, the Character is placed, via the game engine, back into the first zone. At block 209, the game engine displays to the player an effect to the first zone based on the attained first outcome. For example, the effect to the first zone may include, but is not limited to, unlocking a locked first quest, displaying additional available quests, etc. At block 210 the player selects a second one of the non-locked first quests, which may be one of the newly-unlocked quests.

At block 211, the Character is placed, via the game engine, into a second one of the multiple zones once the player has completed the requisite number of first quests. At block 212, the game engine determines an aggregate score for the player based on completed selected first quests and, at block 213, the game engine displays to the player an indication of the aggregate score, which may be a number, letter, symbol, icon, etc., or combination thereof. In an embodiment, the aggregate score is determined based on a ratio of a total score received by or awarded to the player for completed selected quests to a total possible score for the completed selected quests.

In a further embodiment, at block 214, the game engine unlocks a game feature if the player's aggregate score is greater than a predetermined threshold. The game feature may include, as a non-limiting example, one or more buffs for use by the player in a player-selected quest. Exemplary buffs include, but are not limited to, removing one of the first set of predetermined response options for one of the dialogs in the first set of dialogs, automatically selecting one of the first set of predetermined response options for one of the dialogs in the first set of dialogs; and placing the Character, via the game engine, into the first zone to thereby avoid the remainder of the PCS event or secondary/side quest.

In an embodiment, the second one of the multiple zones includes a second NPC for interacting with the Character controlled by the player, and the second zone includes one or more second quests at least one of which is locked and not initially selectable by the player. The completion of a predetermined one or ones of the one or more second quests allows for the Character to proceed to a third one of the multiple of zones.

Block 215 is for further embodiments of the narrative-driven role playing game for teaching leadership skills and is discussed below.

Figure 3:
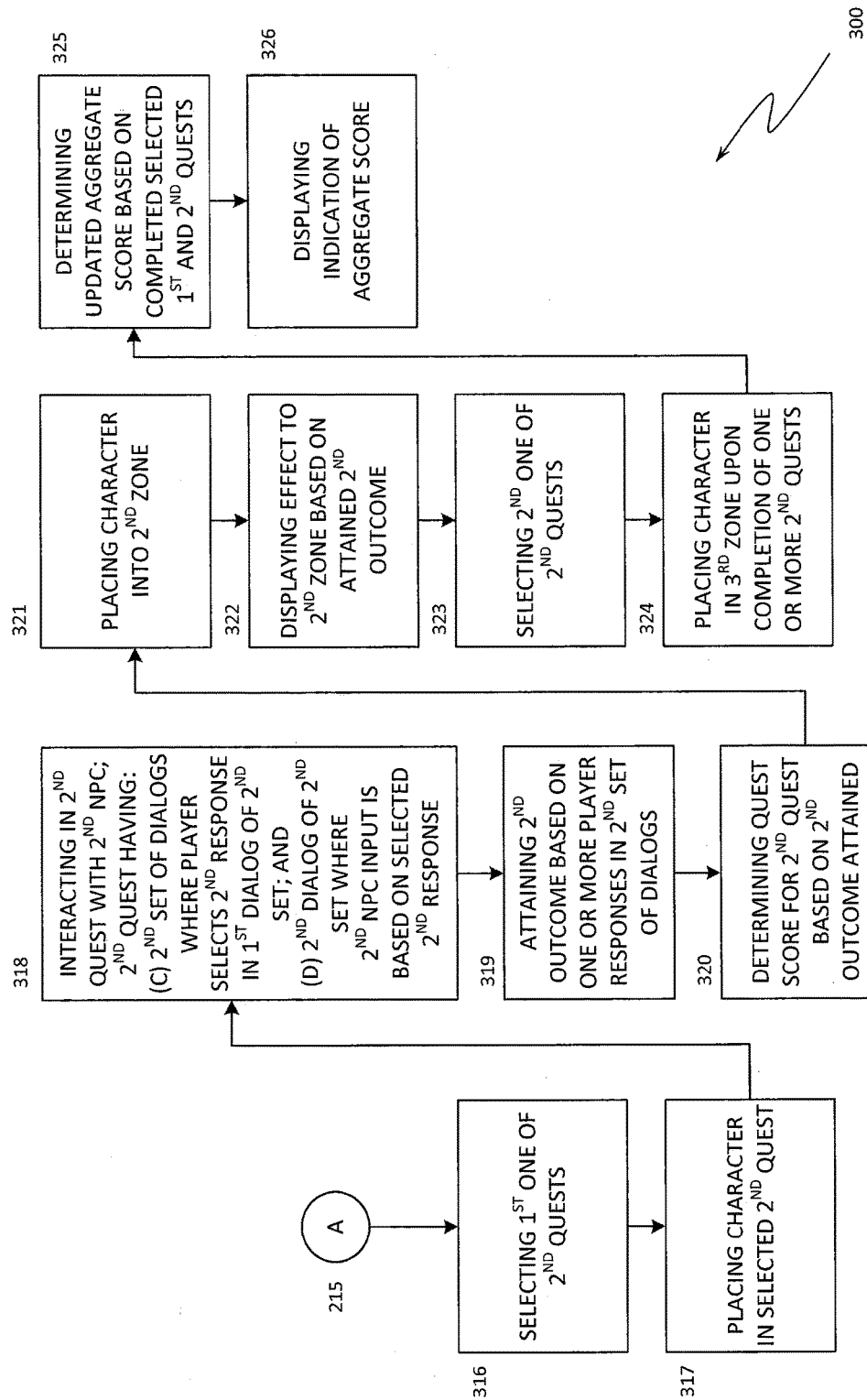
FIG. 3 is a further embodiment for a computer-implemented method for a narrative-driven role playing game for teaching leadership skills according to an embodiment of the present subject matter.

FIG. 3 illustrates a further embodiment 300 for a computer-implemented method for a narrative-driven role playing game for teaching leadership skills. Likewise, FIG. 3 may represent executable instructions for a further embodiment for a narrative-driven role playing game for teaching leadership skills where the executable instructions may be stored on a non-transitory machine-readable medium. Block 215 is from the block diagram in FIG. 2.

At block 316 the player selects, via the game engine, a first one of the non-locked second quests. At block 317, the Character, via the game engine, is placed in the selected second quest. At block 318, the player interacts in the selected second quest with the second NPC in a second set of narrative-driven dialogs. At least one of the second set of narrative-driven dialogs comprises a scenario/interaction which provides leadership training or leadership skills development for the player. In an embodiment, each of the second set of narrative-driven dialogs has a branching dialog tree. A first dialog of the second set of dialogs is presented to the player and includes a predetermined initial input by the second NPC and a second set of predetermined response options. In an embodiment, the response options include a praise response, a coach response, and a scold response. The player selects one of the second predetermined response options and, based on the selected second predetermined response option, a second dialog of the second set of dialogs is presented to the player. The second dialog includes a second input by the second NPC. In an embodiment, the first and second NPCs are the same.

At block 319, the player navigates through the various narrative-driven dialogs until he/she attains one of a predetermined number of second outcomes. In an embodiment, the number of second outcomes equals three. The outcome attained by the player is based on one or more responses selected by the player in the second set of narrative-driven dialogs.

At block 320, the game engine determines a second quest score for the selected second quest where the second quest score is based on the second outcome attained. In an embodiment, the second quest score is a first predetermined score awarded to the player if the player attains a first one of the second outcomes, a second predetermined score if the player attains a second one of the second outcomes, or a third predetermined score if the player attains a third one of the second outcomes. These scores may be the same or different than the scores described above for the first quest score. In a further embodiment, the first, second, and third predetermined scores are different. In a still further embodiment, two of the first, second, and third predetermined scores are the same. In yet a further embodiment, the score awarded to the player depends on the path the player took through the narrative-driven branching dialog tree. In still yet a further embodiment, at least one of the first, second, and third predetermined scores is independent of the path the player took through the branching dialog tree. It is also contemplated by the present disclosure that one or more of the second quests is a non-scoring quest.

In an embodiment, one of the branching dialog trees in the second set of narrative-driven dialogs includes a first path having a first number of second NPC interactions for attaining a first of the predetermined number of outcomes and a second path having a second number of second NPC interactions for attaining the first of the predetermined number of outcomes.

At block 321, the Character is placed, via the game engine, back into the second zone. At block 322, the game engine displays to the player an effect to the second zone based on the attained second outcome. For example, the effect to the second zone may include, but is not limited to, unlocking a locked second quest, displaying additional available quests, etc. At block 323 the player selects a second one of the non-locked second quests, which may be one of the newly-unlocked quests.

At block 324, the Character is placed, via the game engine, into a third one of the multiple zones once the player has completed the requisite number of second quests. At block 325, the game engine determines an updated aggregate score for the player based on completed selected first and second quests, and at block 326, the game engine displays to the player an indication of the updated aggregate score, which may be a number, letter, symbol, icon, etc., or combination thereof. In an embodiment, the updated aggregate score is determined based on a ratio of a total score received by or awarded to the player for completed selected first and second quests to a total possible score for the completed first and second selected quests. In an embodiment, the number of first quests available to the player (either locked or unlocked) is different than the number of second quests (either locked or unlocked).

Figure 4:
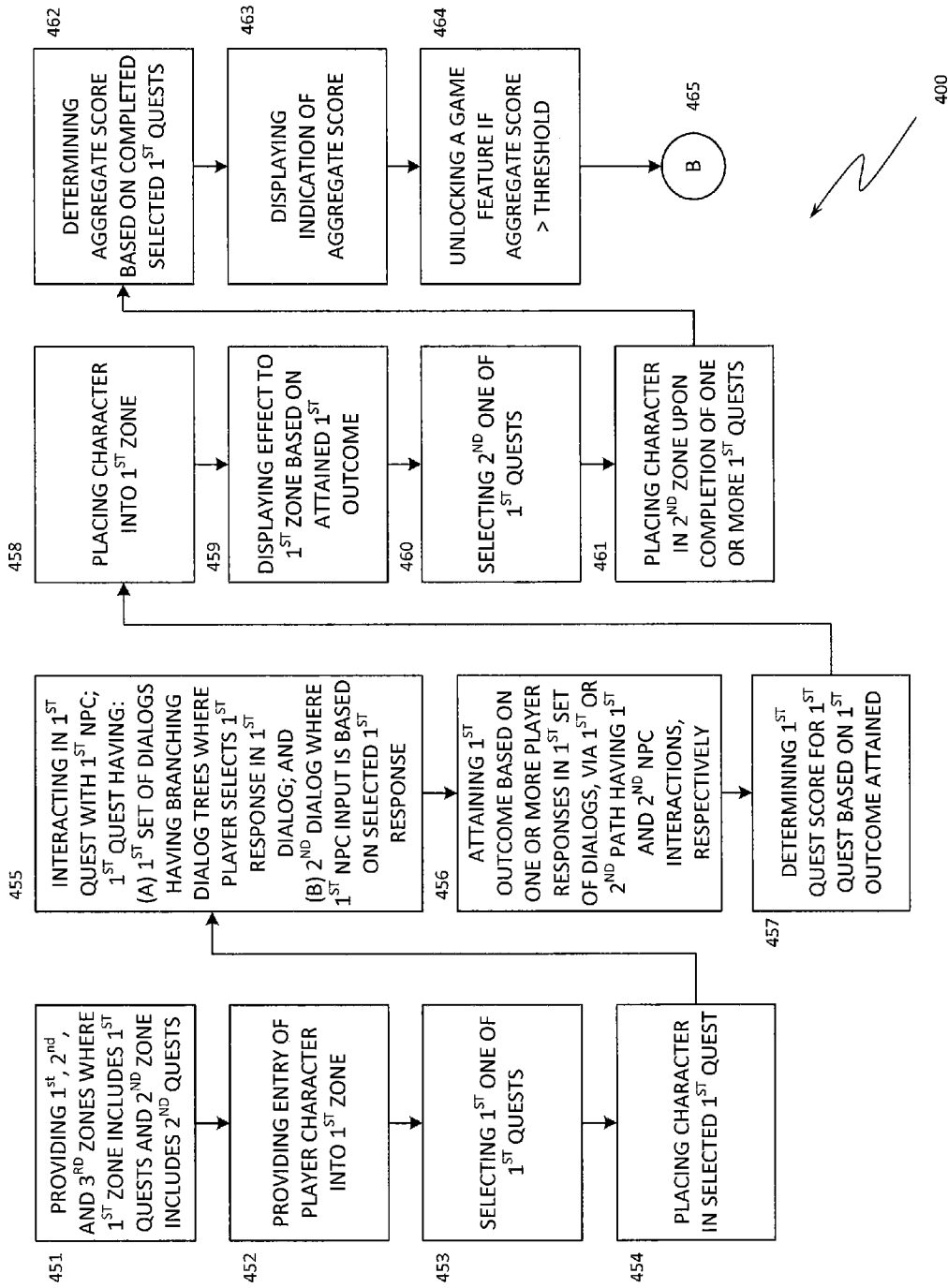
FIG. 4 is another computer-implemented method for a narrative-driven role playing game for teaching leadership skills according to an embodiment of the present subject matter.

Considering FIG. 4, a computer-implemented method 400 for a narrative-driven role playing game to provide leadership training to a player is shown. Likewise, FIG. 4 may represent executable instructions for a narrative-driven role playing game for teaching leadership skills where the executable instructions may be stored on a non-transitory machine-readable medium. Descriptions of concepts provided above are likewise applicable for the similar concepts discussed below.

At block 451, a game engine may provide multiple zones where a first one of the multiple zones includes a first non-player character ("NPC") for interacting with a player character ("Character") controlled by a player of the narrative-driven role playing game, and where the first zone includes one or more first quests (e.g., a PCS event and/or a side quest such as a pass/fail or yes/no event, as described above) at least one of which is locked and not initially selectable by the player. Upon completion of a predetermined one or ones of the first quests allows for the Character to proceed to a second one of the multiple zones. The second one of the multiple zones includes a second NPC for interacting with the Character controlled by the player, and where the second zone includes one or more second quests at least one of which is locked and not initially selectable by the player. Upon completion of a predetermined one or ones of the one or more second quests allows for the Character to proceed to a third one of the multiple zones.

At block 452, the Character is entered, via the game engine, into the first zone. At block 453, the player selects, via the game engine, a first one of the one or more non-locked first quests. At block 454, the Character is placed, via the game engine, in the selected first quest.

At block 455, the player interacts, via the game engine, in the selected first quest with the first NPC in a first set of narrative-driven dialogs each having a branching dialog tree, where a first dialog of the first set of dialogs includes a predetermined initial input by the first NPC and a first plurality of predetermined response options presented to the player. The first plurality of predetermined response options include a praise response, a coach response, and a scold response. The player selects one of the first predetermined response options. A second dialog of the first set of dialogs includes a second input by the first NPC based on the first predetermined response option selected by the player in the first dialog of the first set of dialogs.

At block 456, the player navigates through the various applicable narrative-driven dialogs until he/she attains one of a predetermined number of first outcomes. The outcome attained by the player is based on one or more responses selected by the player in the first set of narrative-driven dialogs. In an embodiment, one of the branching dialog trees in the first set of narrative-driven dialogs includes a first path having a first number of first NPC interactions for attaining a first of the predetermined number of outcomes and a second path having a second number of first NPC interactions for attaining the first of the predetermined number of outcomes.

At block 457, the game engine determines a first quest score for the selected first quest where the first quest score is based on the first outcome attained. At block 458, the Character is placed, via the game engine, back into the first zone. At block 459, the game engine displays to the player an effect to the first zone based on the attained first outcome. In an embodiment, the effect includes unlocking a locked first quest. At block 460, the player selects a second one of the one or more non-locked first quests, which may be one of the newly-unlocked quests.

At block 461, the Character is placed, via the game engine, into a second one of the multiple zones once the player completes the requisite number of first quests. At block 462, the game engine determines an aggregate score for the player based on completed selected first quests. At block 463, the game engine displays to the player, an indication of the aggregate score. At block 464, the game engine unlocks a game feature if the player's aggregate score is greater than a predetermined threshold.

Figure 5:
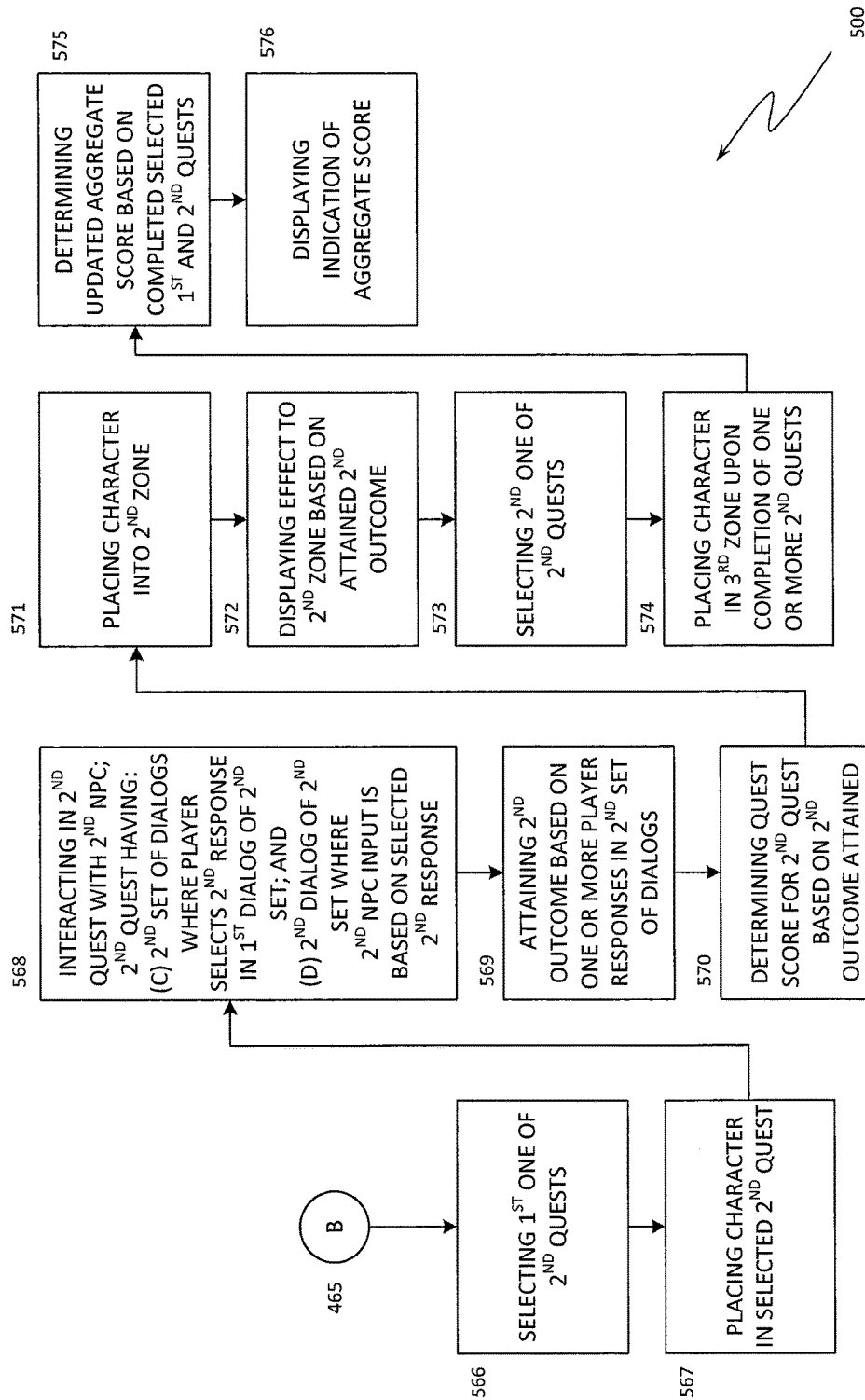
FIG. 5 is a further embodiment for a computer-implemented method for a narrative-driven role playing game for teaching leadership skills according to an embodiment of the present subject matter.

At block 465, the narrative-driven role playing game continues in FIG. 5.

At block 566, the player selects, via the game engine, a first one of the one or more non-locked second quests. At block 567, the Character is placed, via the game engine, in the selected second quest.

At block 568, the player interacts, via the game engine, in the selected second quest with the second NPC in a second set of narrative-driven dialogs each having a branching dialog tree, where a first dialog of the second set of dialogs includes a predetermined initial input by the second NPC. A second plurality of predetermined response options is presented to the player where the second plurality of predetermined response options include a praise response, a coach response, and a scold response. The player selects one of the second predetermined response options, and a second dialog of the second set of dialogs, which includes a second input by the second NPC, is presented to the player based on the second predetermined response option selected by the player in the first dialog of the second set of dialogs.

At block 569, the player attains one of a predetermined number of second outcomes based on one or more responses selected by the player in the second set of narrative-driven dialogs. At block 570, the game engine determines a score for the selected second quest where the score is based, at least in part, on the second outcome attained. At block 571, the Character is placed, via the game engine, back into the second zone. At block 572, the game engine displays to the player an effect to the second zone based on the attained second outcome In an embodiment, the effect includes unlocking a locked second quest.

At block 573, the player selects, via the game engine, a second one of the one or more non-locked second quests, which may be one of the newly-unlocked second quests. At block 574, the Character is placed, via the game engine, into a third one of the multiple zones once the player completes the requisite number of second quests.

At block 575, the game engine determines an updated aggregate score for the player based on completed selected first and second quests. At block 576, the game engine displays to the player an indication of the updated aggregate score.

Figure 6:
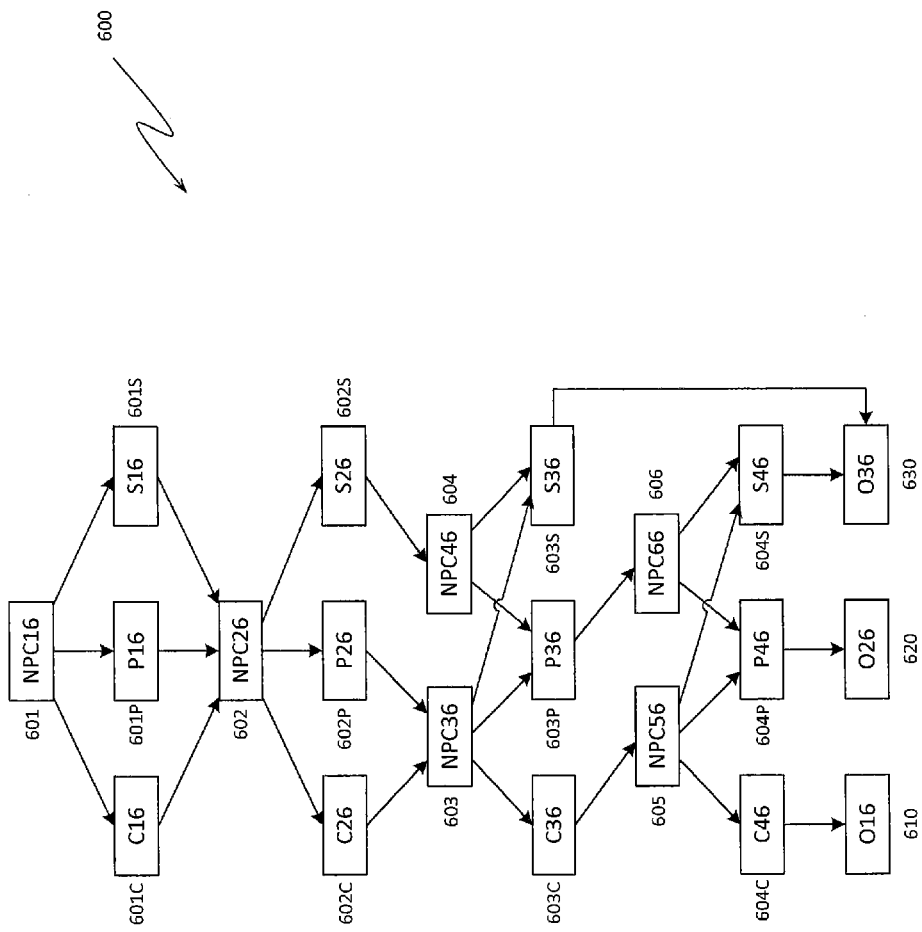
FIG. 6 is an exemplary branching dialog tree of a narrative-driven dialog for one or more PCS events according to an embodiment of the present subject matter.

FIG. 6 depicts an exemplary branching dialog tree 600 of a narrative-driven dialog (e.g., a first set of dialogs) for one or more PCS events according to an embodiment of the present subject matter. The narrative-driven dialog begins with a first dialog (blocks 601, 601C, 601P, and 601S) and ends with one of three (in this particular embodiment) outcomes (blocks 610, 620, and 630).

The narrative-driven dialog begins at a first dialog where a NPC presents to the player a predetermined initial input at block 601 ("NPC 16") along with a first set of predetermined response options at blocks 601C, 601P, and 601S, which represent, respectively, a coach response ("C16"), a praise response ("P16"), and a scold response ("S16"). In an embodiment, the particular response chosen by the player (for any of the dialogs) may also have an effect on one or more subsequent dialogs in the branching dialog tree 600, such as, but not limited to, the NPC input at in a subsequent dialog and/or the number of and/or contents of choices for the predetermined response options presented to the player.

After the player chooses one of the C16, P16, or S16 responses, the game engine continues the branching dialog tree 600 by presenting to the player a second dialog by the NPC (typically, but not necessarily, the same NPC as in the first dialog) at block 602 ("NPC26") along with a second set of predetermined response options represented by blocks 602C, 602P, and 602S ("C26", "P26", and "S26", respectively). In this particular embodiment, if the player chooses either the C26 or P26 response, the player will be presented with a third dialog by the NPC at block 603 ("NPC36") along with predetermined response options represented by blocks 603C ("C36"), 603P ("P36"), and 603S ("S36"). If the player chooses the S26 response, the player will be presented with a fourth dialog by the NPC at bock 604 ("NPC46") along with the predetermined response options represented by blocks 603P ("P36"), and 603S ("S36").

In the event that the third dialog is presented to the player and the player chooses the C36 response, the player will be presented with a fifth dialog by the NPC at block 605 ("NPC56") along with predetermined response options represented by blocks 604C ("C46"), 604P ("P46"), and 604S ("S46"). In the event that the third dialog is presented to the player and the player chooses the P36 response, the player will be presented with a sixth dialog by the NPC at block 606 ("NPC66") along with predetermined response options represented by blocks 604P ("P46"), and 604S ("S46"). In the event that the third dialog is presented to the player and the player chooses the S36 response, the game engine will present to the player the scold outcome at block 630 ("O36"). As discussed above, the game engine may then determine a score for the player for this first set of dialogs, may place the Character back into the appropriate zone, and may also display to the player an effect to that zone based on the O36 outcome. The particular outcome achieved by the player may also have an effect on a branching dialog tree of one or more subsequent narrative-driven dialogs, such as, but not limited to, the NPC input at one or more dialogs in a subsequent branching dialog and/or the number of and/or contents of choices for the predetermined response options presented to the player.

In the event that the fourth dialog is presented to the player and the player chooses the P36 response, the player will be presented with the sixth dialog by the NPC at block 606 ("NPC66") along with predetermined response options represented by blocks 604P ("P46") and 604S ("S46"). In the event that the fourth dialog is presented to the player and the player chooses the S36 response, the game engine will present to the player the scold outcome at block 630 ("O36").

In the event that the fifth dialog is presented to the player and the player chooses the C46 response, the game engine will present to the player the coach outcome at block 610 ("O16"). In the event that the fifth dialog is presented to the player and the player chooses the P46 response, the game engine will present to the player the praise outcome at block 620 ("O26"). In the event that the fifth dialog is presented to the player and the player chooses the S46 response, the game engine will present to the player the scold outcome at block 630 ("O36"). As discussed above, the game engine may then determine a score for the player for this first set of dialogs, based on the outcome achieved by the player, may place the Character back into the appropriate zone, and may also display to the player an effect to that zone based on the outcome achieved. The particular outcome achieved by the player may also have an effect on a branching dialog tree of one or more subsequent narrative-driven dialogs, such as, but not limited to, the NPC input at one or more dialogs in a subsequent branching dialog and/or the number of and/or contents of choices for the predetermined response options presented to the player.

In the event that the sixth dialog is presented to the player and the player chooses the P46 response, the game engine will present to the player the praise outcome at block 620 ("O26"). In the event that the sixth dialog is presented to the player and the player chooses the S46 response, the game engine will present to the player the scold outcome at block 630 ("O36").

As can be seen from FIG. 6, certain outcomes can be reached via separate paths. For example, the scold outcome ("O3") can be reached via a number of paths such as: NPC16→S16→NPC26→S26→NPC46→S36→O36; or NPC16→C16→NPC26→P26→NPC36→P36→NPC66→S46→O36. It will also be noted that different paths may include a different number of dialogs.

Figure 7:
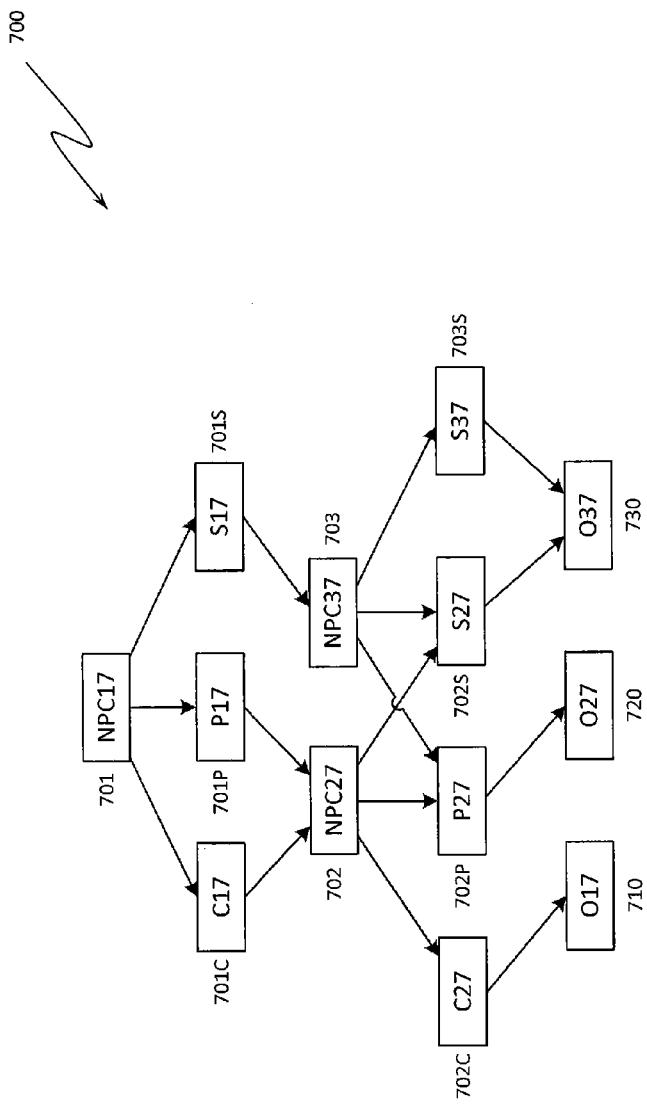
FIG. 7 is another exemplary branching dialog tree of a narrative-driven dialog for one or more PCS events according to an embodiment of the present subject matter.

Turning now to FIG. 7, presented is another exemplary branching dialog tree 700 of a narrative-driven dialog (e.g., a second set of dialogs) for one or more PCS events according to an embodiment of the present subject matter. The narrative-driven dialog begins with a first dialog (blocks 701, 701C, 701P, and 701S) and ends with one of three (in this particular embodiment) outcomes (blocks 710, 720, and 730).

This exemplary narrative-driven dialog begins at a first dialog where a NPC (which may be different than the NPC or NPCs in FIG. 6) presents to the player a predetermined initial input at block 701 ("NPC17") along with a first set of predetermined response options at blocks 701C, 701P, and 701S, which represent, respectively, a coach response ("C17"), a praise response ("P17"), and a scold response ("S17"). In an embodiment, the particular response chosen by the player (for any of the dialogs) may also have an effect on one or more subsequent dialogs in the branching dialog tree 700, such as, but not limited to, the NPC input at in a subsequent dialog and/or the number of and/or contents of choices for the predetermined response options presented to the player.

After the player chooses one of the C17, P17, or S17 responses, the game engine continues the branching dialog tree 700. In this particular embodiment, if the player chooses either the C17 or P17 response, the player will be presented with a second dialog by the NPC at block 702 ("NPC27") along with predetermined response options represented by blocks 702C ("C27"), 702P ("P27"), and 702S ("S27"). If the player chooses the S17 response, the player will be presented with a third dialog by the NPC at bock 703 ("NPC37") along with the predetermined response options represented by blocks 702P ("P27"), 702S ("S27"), and 703S ("S37"). It will be noted that, as shown by the third dialog, the predetermined response options presented to the player need not each be in a different praise, coach, scold category.

In the event that the second dialog is presented to the player and the player chooses the C27 response, the game engine will present to the player the coach outcome at block 710 ("O17"). In the event that the second dialog is presented to the player and the player chooses the P27 response, the game engine will present to the player the praise outcome at block 720 ("O27"). In the event that the second dialog is presented to the player and the player chooses the S27 response, the game engine will present to the player the scold outcome at block 730 ("O37").

In the event that the third dialog is presented to the player and the player chooses the P27 response, the game engine will present to the player the praise outcome at block 720 ("O27"). In the event that the third dialog is presented to the player and the player chooses either the S27 response or the S37 response, the game engine will present to the player the scold outcome at block 730 ("O37").

As discussed above, the game engine may then determine a score for the player for this second set of dialogs, based on the outcome achieved by the player, may place the Character back into the appropriate zone, and may also display to the player an effect to that zone based on the outcome achieved. The particular outcome achieved by the player may also have an effect on a branching dialog tree of one or more subsequent narrative-driven dialogs, such as, but not limited to, the NPC input at one or more dialogs in a subsequent branching dialog and/or the number of and/or contents of choices for the predetermined response options presented to the player.

Figure 8:
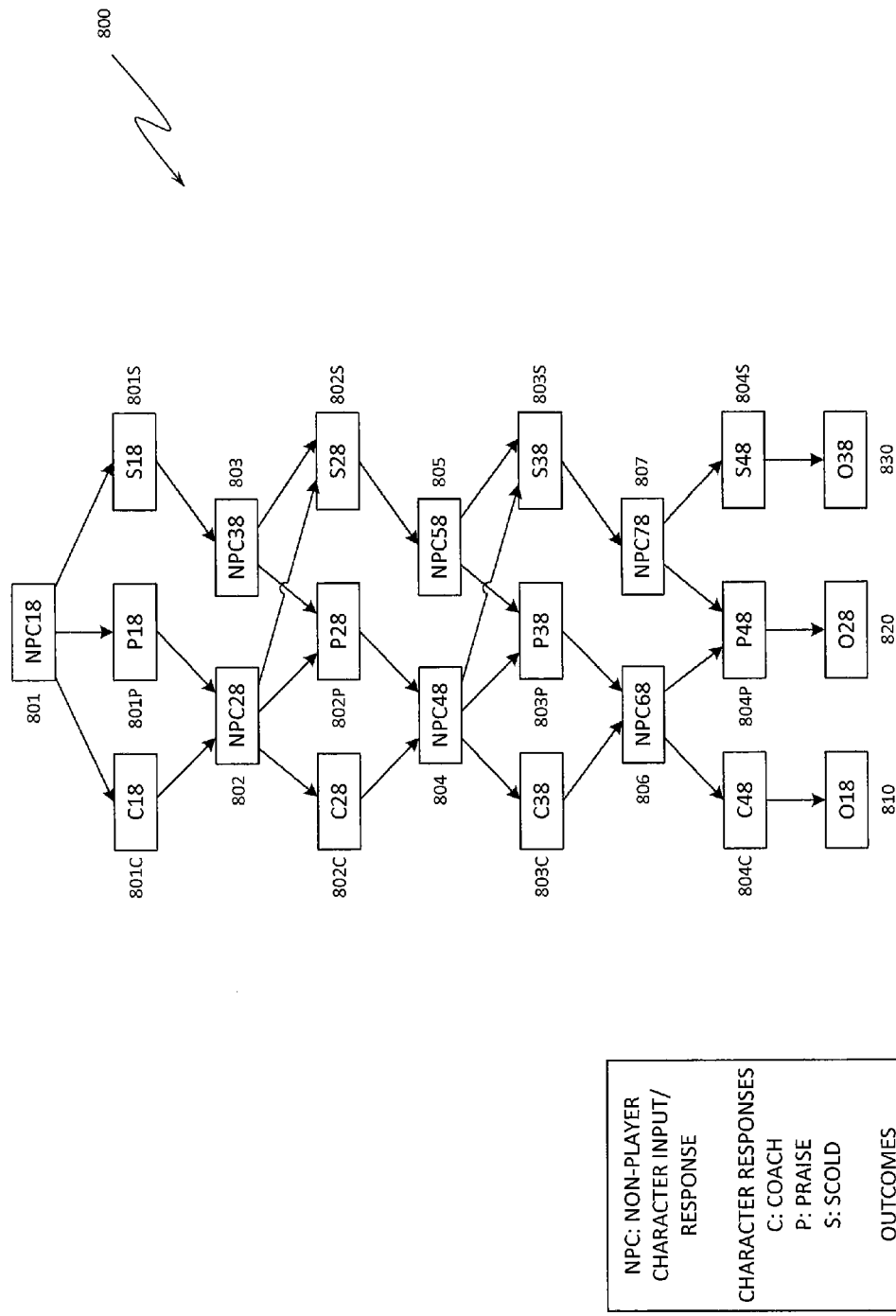
FIG. 8 is yet another exemplary branching dialog tree of a narrative-driven dialog for one or more PCS events according to an embodiment of the present subject matter.

With attention now drawn to FIG. 8, a third exemplary branching dialog tree 800 of a narrative-driven dialog (e.g., a third set of dialogs) for one or more PCS events is presented according to an embodiment of the present subject matter. The narrative-driven dialog begins with a first dialog (blocks 801, 801C, 801P, and 801S) and ends with one of three (in this particular embodiment) outcomes (blocks 810, 820, and 830).

This exemplary narrative-driven dialog begins at a first dialog where a NPC (which may be different than the NPC or NPCs in either FIG. 6 or FIG. 7) presents to the player a predetermined initial input at block 801 ("NPC18") along with a first set of predetermined response options at blocks 801C, 801P, and 801S, which represent, respectively, a coach response ("C18"), a praise response ("P18"), and a scold response ("S18"). In an embodiment, the particular response chosen by the player (for any of the dialogs) may also have an effect on one or more subsequent dialogs in the branching dialog tree 800, such as, but not limited to, the NPC input at in a subsequent dialog and/or the number of and/or contents of choices for the predetermined response options presented to the player.

After the player chooses one of the C18, P18, or S18 responses, the game engine continues the branching dialog tree 800. In this particular embodiment, if the player chooses either the C18 or P18 response, the player will be presented with a second dialog by the NPC at block 802 ("NPC28") along with predetermined response options represented by blocks 802C ("C28"), 802P ("P28"), and 802S ("S28"). If the player chooses the S18 response, the player will be presented with a third dialog by the NPC at bock 803 ("NPC38") along with the predetermined response options represented by blocks 802P ("P28") and 802S ("S28").

In the event that the second dialog is presented to the player and the player chooses the C28 response, the player will be presented with a fourth dialog by the NPC at block 804 ("NPC48") along with predetermined response options represented by blocks 803C ("C38"), 803P ("P38"), and 803S ("S38"). In the event that the second dialog is presented to the player and the player chooses the P28 response, the player will be presented with the fourth dialog by the NPC at block 804 ("NPC48") along with predetermined response options represented by blocks 803C ("C38"), 803P ("P38"), and 803S ("S38"). In the event that the second dialog is presented to the player and the player chooses the S28 response, the player will be presented with a fifth dialog by the NPC at block 805 ("NPC58") along with predetermined response options represented by blocks 803P ("P38") and 803S ("S38").

In the event that the third dialog is presented to the player and the player chooses the P28 response, the player will be presented with the fourth dialog by the NPC at block 804 ("NPC48") along with predetermined response options represented by blocks 803C ("C38"), 803P ("P38"), and 803S ("S38"). In the event that the third dialog is presented to the player and the player chooses the S28 response, the player will be presented with the fifth dialog by the NPC at block 805 ("NPC58") along with predetermined response options represented by blocks 803P ("P38") and 803S ("S38").

In the event that the fourth dialog is presented to the player and the player chooses the C38 response, the player will be presented with a sixth dialog by the NPC at block 806 ("NPC68") along with predetermined response options represented by blocks 804C ("C48") and 804P ("P48"). In the event that the fourth dialog is presented to the player and the player chooses the P38 response, the player will be presented with the sixth dialog by the NPC at block 806 ("NPC68") along with predetermined response options represented by blocks 804C ("C48") and 804P ("P48"). In the event that the fourth dialog is presented to the player and the player chooses the S38 response, the player will be presented with a seventh dialog by the NPC at block 807 ("NPC78") along with predetermined response options represented by blocks 804P ("P48") and 804S ("S48").

In the event that the fifth dialog is presented to the player and the player chooses the P38 response, the player will be presented with the sixth dialog by the NPC at block 806 ("NPC68") along with predetermined response options represented by blocks 804C ("C48") and 804P ("P48"). In the event that the fifth dialog is presented to the player and the player chooses the S38 response, the player will be presented with the seventh dialog by the NPC at block 807 ("NPC78") along with predetermined response options represented by blocks 804P ("P48") and 804S ("S48").

In the event that the sixth dialog is presented to the player and the player chooses the C48 response, the game engine will present to the player the coach outcome at block 810 ("O18"). In the event that the sixth dialog is presented to the player and the player chooses the P48 response, the game engine will present to the player the praise outcome at block 820 ("O28").

In the event that the seventh dialog is presented to the player and the player chooses the P48 response, the game engine will present to the player the praise outcome at block 820 ("O28"). In the event that the seventh dialog is presented to the player and the player chooses the S48 response, the game engine will present to the player the scold outcome at block 830 ("O38").

As discussed above, the game engine may then determine a score for the player for this third set of dialogs, based on the outcome achieved by the player, may place the Character back into the appropriate zone, and may also display to the player an effect to that zone based on the outcome achieved. The particular outcome achieved by the player may also have an effect on a branching dialog tree of one or more subsequent narrative-driven dialogs, such as, but not limited to, the NPC input at one or more dialogs in a subsequent branching dialog and/or the number of and/or contents of choices for the predetermined response options presented to the player.

Figure 9:
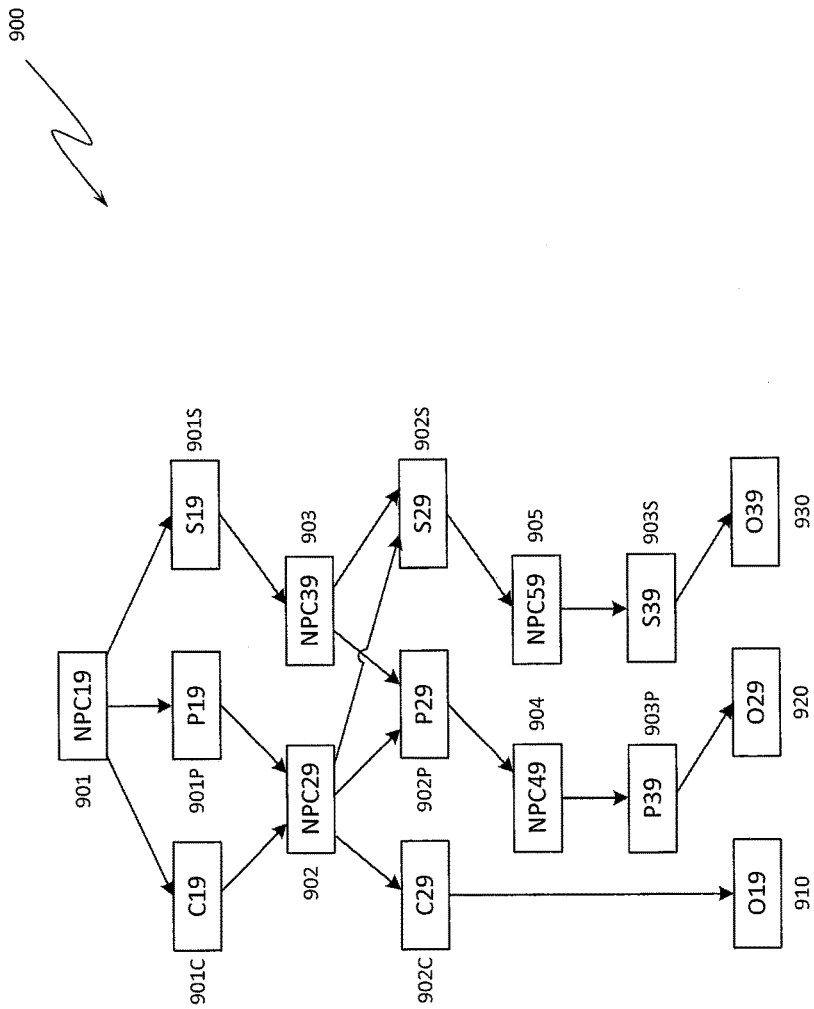
FIG. 9 is yet still another exemplary branching dialog tree of a narrative-driven dialog for one or more PCS events according to an embodiment of the present subject matter.

Now considering FIG. 9, a fourth exemplary branching dialog tree 900 of a narrative-driven dialog (e.g., a fourth set of dialogs) for one or more PCS events is presented according to an embodiment of the present subject matter. The narrative-driven dialog begins with a first dialog (blocks 901, 901C, 901P, and 901S) and ends with one of three (in this particular embodiment) outcomes (blocks 910, 920, and 930).

This exemplary narrative-driven dialog begins at a first dialog where a NPC (which may be different than the NPC or NPCs in either FIG. 6, FIG. 7, of FIG. 8) presents to the player a predetermined initial input at block 901 ("NPC19") along with a first set of predetermined response options at blocks 901C, 901P, and 901S, which represent, respectively, a coach response ("C19"), a praise response ("P19"), and a scold response ("S19"). In an embodiment, the particular response chosen by the player (for any of the dialogs) may also have an effect on one or more subsequent dialogs in the branching dialog tree 900, such as, but not limited to, the NPC input at in a subsequent dialog and/or the number of and/or contents of choices for the predetermined response options presented to the player.

After the player chooses one of the C19, P19, or S19 responses, the game engine continues the branching dialog tree 900. In this particular embodiment, if the player chooses either the C19 or P19 response, the player will be presented with a second dialog by the NPC at block 902 ("NPC29") along with predetermined response options represented by blocks 902C ("C29"), 902P ("P29"), and 902S ("S29"). If the player chooses the S19 response, the player will be presented with a third dialog by the NPC at bock 903 ("NPC39") along with the predetermined response options represented by blocks 902P ("P29") and 902S ("S29").

In the event that the second dialog is presented to the player and the player chooses the C29 response, the game engine will present to the player the coach outcome at block 910 ("O19"). In the event that the second dialog is presented to the player and the player chooses the P29 response, the player will be presented with a fourth dialog by the NPC at block 904 ("NPC49") along with a predetermined response represented by block 903P ("P39"). Once the player selects the P39 response, the game engine will present to the player the praise outcome at block 920 ("O29"). In the event that the second dialog is presented to the player and the player chooses the S29 response, the player will be presented with a fifth dialog by the NPC at block 905 ("NPC59") along with a predetermined response represented by block 903S ("S39"). Once the player selects the S39 response, the game engine will present to the player the scold outcome at block 930 ("O39").

As discussed above, the game engine may then determine a score for the player for this fourth set of dialogs, based on the outcome achieved by the player, may place the Character back into the appropriate zone, and may also display to the player an effect to that zone based on the outcome achieved. The particular outcome achieved by the player may also have an effect on a branching dialog tree of one or more subsequent narrative-driven dialogs, such as, but not limited to, the NPC input at one or more dialogs in a subsequent branching dialog and/or the number of and/or contents of choices for the predetermined response options presented to the player.

Figure 10:
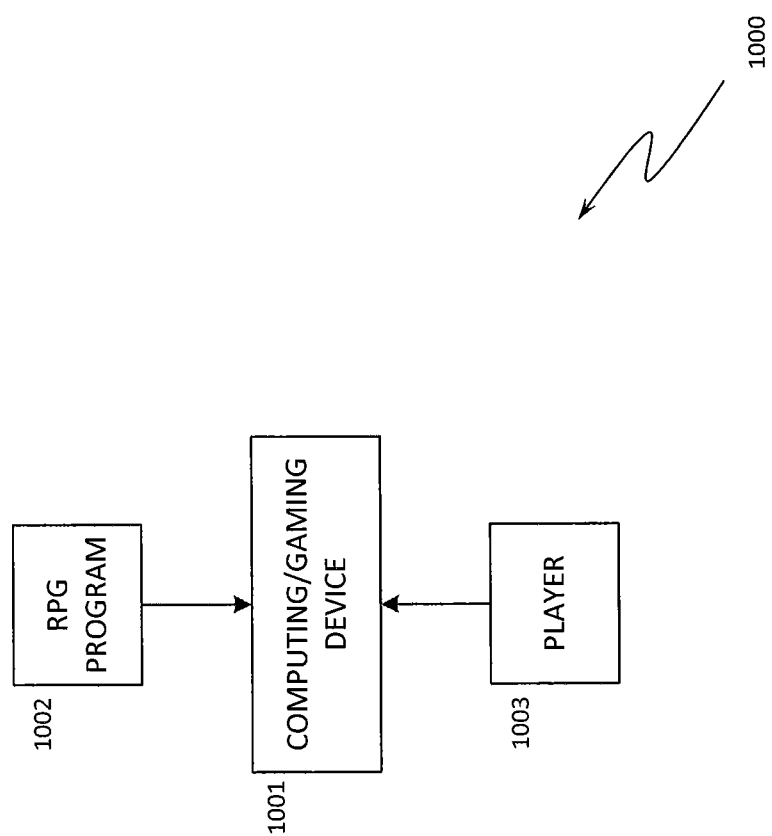
FIG. 10 is a high-level block diagram according to an embodiment of the present subject matter.

Continuing now to FIG. 10, a high-level block diagram 1000 is presented according to an embodiment of the present subject matter. Computing/gaming device 1001 may be programmed by way of non-transitory machine-readable medium 1002 having stored thereon a plurality of executable instructions for a narrative-driven role playing game for teaching leadership skills. The computing/gaming device 1001 may also receive inputs from and display results to player 1003.

Certain embodiments of the present disclosure may be implemented by a computing/gaming device programmed in accordance with the principals discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and protected by the following claims.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

A computer program (also known as a program, software, software application, script, code, or executable instructions) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Computer readable media suitable for storing computer program instructions and data include all forms data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computing/gaming device having a display device, e.g., a cathode ray tube (CRT) or liquid crystal display (LCD) monitor, or the like, for displaying information to the user and a keyboard and/or a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing/gaming system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing/gaming system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the claimed subject matter, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While some embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A computer-implemented method for a narrative-driven role playing game, the method comprising the steps of:
 (a) providing, by a game engine, a plurality of zones wherein a first one of the plural zones includes a first non-player character ("NPC") for interacting with a player character ("Character") controlled by a player, and wherein the first zone includes one or more first quests at least one of which is locked and not initially selectable by the player, and wherein the completion of a predetermined one or ones of the one or more first quests allows for the Character to proceed to a second one of the plurality of zones;
 (b) providing, via the game engine, an entry of the Character into the first zone;
 (c) selecting, by the player via the game engine, a first one of the one or more non-locked first quests;
 (d) placing the Character, via the game engine, in the selected first quest;
 (e) interacting, by the player via the game engine, in the selected first quest with the first NPC in a first set of narrative-driven dialogs each having a branching dialog tree, wherein a first dialog of the first set of dialogs includes a predetermined initial input by the first NPC and a first plurality of predetermined response options presented to the player, wherein the player selects one of the first predetermined response options, and wherein a second dialog of the first set of dialogs includes a second input by the first NPC based on the first predetermined response option selected by the player in the first dialog of the first set of dialogs;
 (f) attaining one of a predetermined number of first outcomes based on one or more responses selected by the player in the first set of narrative-driven dialogs;

(g) determining, via the game engine, a first quest score for the selected first quest wherein the first quest score is based on the first outcome attained;
(h) placing the Character, via the game engine, into the first zone;
(i) displaying to the player, via the game engine, an effect to the first zone based on the attained first outcome wherein the effect includes unlocking a locked first quest;
(j) selecting, by the player via the game engine, a second one of the one or more non-locked first quests;
(k) placing the Character, via the game engine, into a second one of the plural zones upon the player's completion of the predetermined one or ones of the one or more first quests;
(l) determining, via the game engine, an aggregate score for the player based on completed selected first quests; and
(m) displaying, to the player, an indication of the aggregate score; and
(n) providing, via the game engine, coaching feedback to guide the player on decision making, based on performance by the player in the narrative-driven role playing game.

2. The method of claim 1 wherein at least one of the first set of narrative-driven dialogs comprises a scenario for providing leadership training to the player, and the coaching feedback relates to leadership decision making.

3. The method of claim 2 wherein the first plurality of predetermined response options equals three.

4. The method of claim 3 wherein the first plurality of predetermined response options are selected from the group consisting of: praise, coach, and scold.

5. The method of claim 1 wherein the predetermined number of first outcomes equals three.

6. The method of claim 5 wherein the first quest score is a first predetermined score in response to the player attaining a first one of the first outcomes, a second predetermined score in response to the player attaining a second one of the first outcomes, or a third predetermined score in response to the player attaining a third one of the first outcomes, wherein the first, second, and third predetermined scores are different.

7. The method of claim 6 wherein at least one of the first, second, and third predetermined scores is independent of a path through the branching dialog tree of the first set of narrative-driven dialogs.

8. The method of claim 6 wherein the aggregate score is determined based on a ratio of a total score received by the player for completed selected quests to a total possible score for the completed selected quests.

9. The method of claim 1 further comprising the step of:
(o) unlocking, via the game engine, a game feature if the aggregate score is greater than a predetermined threshold.

10. The method of claim 9 wherein the game feature provides the player, via the game engine, one of a plurality of buffs for use in a player-selected quest.

11. The method of claim 10 wherein the plurality of buffs are selected from the group consisting of: removing one of the plurality of predetermined response options for one of the dialogs in the first set of dialogs, automatically selecting one of the plurality of predetermined response options for one of the dialogs in the first set of dialogs; and placing the Character, via the game engine, into the first zone.

12. The method of claim 1 wherein the plurality of zones equals five.

13. The method of claim 1 wherein one of the one or more first quests is a non-scoring quest.

14. The method of claim 1 wherein one of the branching dialog trees in the first set of narrative-driven dialogs includes a first path having a first number of NPC interactions for attaining a first of the predetermined number of outcomes and a second path having a second number of NPC interactions for attaining the first of the predetermined number of outcomes.

15. The method of claim 1 wherein the second one of the plural zones includes a second NPC for interacting with the Character controlled by the player, and wherein the second zone includes one or more second quests at least one of which is locked and not initially selectable by the player, and wherein the completion of a predetermined one or ones of the one or more second quests allows for the Character to proceed to a third one of the plurality of zones.

16. The method of claim 15 further comprising the steps of:
(o) selecting, by the player via the game engine, a first one of the one or more non-locked second quests;
(p) placing the Character, via the game engine, in the selected second quest;
(q) interacting, by the player via the game engine, in the selected second quest with the second NPC in a second set of narrative-driven dialogs each having a branching dialog tree, wherein a first dialog of the second set of dialogs includes a predetermined initial input by the second NPC and a second plurality of predetermined response options presented to the player, wherein the player selects one of the second predetermined response options, and wherein a second dialog of the second set of dialogs includes a second input by the second NPC based on the second predetermined response option selected by the player in the first dialog of the second set of dialogs;
(r) attaining one of a predetermined number of second outcomes based on one or more responses selected by the player in the second set of narrative-driven dialogs;
(s) determining, via the game engine, a score for the selected second quest wherein the score is based on the second outcome attained;
(t) placing the Character, via the game engine, into the second zone;
(u) displaying to the player, via the game engine, an effect to the second zone based on the attained second outcome wherein the effect includes unlocking a locked second quest;
(v) selecting, by the player via the game engine, a second one of the one or more non-locked second quests;
(w) placing the Character, via the game engine, into a third one of the plural zones upon the player's completion of the predetermined one or ones of the one or more second quests;
(x) determining, via the game engine, an updated aggregate score for the player based on completed selected first and second quests; and
(y) displaying, to the player, an indication of the updated aggregate score.

17. The method of claim 15 wherein the first NPC and the second NPC are the same.

18. The method of claim 15 wherein the number of first quests is different than the number of second quests.

19. A non-transitory machine-readable medium having stored thereon a plurality of executable instructions for a narrative-driven role playing game, the plurality of instructions comprising instructions to:

(a) provide, by a game engine, a plurality of zones wherein a first one of the plural zones includes a first non-player character ("NPC") for interacting with a player character ("Character") controlled by a player, and wherein the first zone includes one or more first quests at least one of which is locked and not initially selectable by the player, and wherein the completion of a predetermined one or ones of the one or more first quests allows for the Character to proceed to a second one of the plurality of zones;

(b) provide, via the game engine, an entry of the Character into the first zone;

(c) select, by the player via the game engine, a first one of the one or more non-locked first quests;

(d) place the Character, via the game engine, in the selected first quest;

(e) interact, by the player via the game engine, in the selected first quest with the first NPC in a first set of narrative-driven dialogs each having a branching dialog tree, wherein a first dialog of the first set of dialogs includes a predetermined initial input by the first NPC, a first plurality of predetermined response options presented to the player, and a first selection by the player of one of the first predetermined response options, and wherein a second dialog of the first set of dialogs includes a second input by the first NPC based on the first predetermined response option selected by the player in the first dialog of the first set of dialogs;

(f) attain one of a predetermined number of first outcomes based on the responses selected by the player in the first set of narrative-driven dialogs;

(g) determine, via the game engine, a first quest score for the selected first quest wherein the first quest score is based on the first outcome attained;

(h) place the Character, via the game engine, into the first zone;

(i) display to the player, via the game engine, an effect to the first zone based on the attained first outcome wherein the effect includes unlocking a locked first quest;

(j) select, by the player via the game engine, a second one of the one or more non-locked first quests;

(k) place the Character, via the game engine, into a second of the plural zones upon the player's completion of the predetermined one or ones of the one or more first quests;

(l) determine, via the game engine, an aggregate score for the player based on completed selected first quests;

(m) display, to the player, an indication of the aggregate score; and (n) provide, via the game engine, coaching feedback to guide the player on decision making, based on performance by the player in the narrative-driven role playing game.

20. The non-transitory machine-readable medium of claim 19, wherein at least one of the first set of narrative-driven dialogs comprises a scenario for providing leadership training to the player, and the coaching feedback relates to leadership decision making.

21. The non-transitory machine-readable medium of claim 20 wherein the first plurality of predetermined response options equals three.

22. The non-transitory machine-readable medium of claim 21 wherein the first plurality of predetermined response options are selected from the group consisting of: praise, coach, and scold.

23. The non-transitory machine-readable medium of claim 19 wherein the predetermined number of first outcomes equals three.

24. The non-transitory machine-readable medium of claim 23 wherein the first quest score is a first predetermined score upon in response to the player attaining a first one of the first outcomes, a second predetermined score in response to the player attaining a second one of the first outcomes, or a third predetermined score in response to the player attaining a third one of the first outcomes, wherein the first, second, and third predetermined scores are different.

25. The non-transitory machine-readable medium of claim 24 wherein at least one of the first, second, and third predetermined scores is independent of a path through the branching dialog tree of the first set of narrative-driven dialogs.

26. The non-transitory machine-readable medium of claim 24 wherein the indication of an aggregate score is determined based on a ratio of a total score received by the player for completed selected quests to a total possible score for the completed selected quests.

27. The non-transitory machine-readable medium of claim 19 further comprising instructions to:
(n) unlock, via the game engine, a game feature if the aggregate score is greater than a predetermined threshold.

28. The non-transitory machine-readable medium of claim 27 wherein the game feature provides the player, via the game engine, one of a plurality of buffs for use in a player-selected quest.

29. The non-transitory machine-readable medium of claim 28 wherein the plurality of buffs are selected from the group consisting of: removing one of the plurality of predetermined response options for one of the dialogs in the first set of dialogs, automatically selecting one of the plurality of predetermined response options for one of the dialogs in the first set of dialogs; and placing the Character, via the game engine, into the first zone.

30. The non-transitory machine-readable medium of claim 19 wherein the plurality of zones equals five.

31. The non-transitory machine-readable medium of claim 19 wherein one of the one or more first quests is a non-scoring quest.

32. The non-transitory machine-readable medium of claim 19 wherein one of the branching dialog trees in the first set of narrative-driven dialogs includes a first path having a first number of NPC interactions for attaining a first of the predetermined number of outcomes and a second path having a second number of NPC interactions for attaining the first of the predetermined number of outcomes.

33. The non-transitory machine-readable medium of claim 19 wherein the second one of the plural zones includes a second NPC for interacting with the Character controlled by the player, and wherein the second zone includes one or more second quests at least one of which is locked and not initially selectable by the player, and wherein the completion of a predetermined one or ones of the one or more second quests allows for the Character to proceed to a third one of the plurality of zones.

34. The non-transitory machine-readable medium of claim 33 further comprising instructions to:
(o) select, by the player via the game engine, a first one of the one or more non-locked second quests;
(p) place the Character, via the game engine, in the selected second quest;
(q) interact, by the player via the game engine, in the selected second quest with the second NPC in a second set of narrative-driven dialogs each having a branching dialog tree, wherein a first dialog of the second set of dialogs includes a predetermined initial input by the second NPC, a second plurality of predetermined response options presented to the player, and a second selection by the player of one of the second predetermined response options, and wherein a second dialog of the second set of dialogs includes a second input by the second NPC based on the second predetermined response option selected by the player in the first dialog of the second set of dialogs;

(r) attain one of a predetermined number of second outcomes based on the responses selected by the player in the second set of narrative-driven dialogs;

(s) determine, via the game engine, a score for the selected second quest wherein the score is based on the second outcome attained;

(t) place the Character, via the game engine, into the second zone;

(u) display to the player, via the game engine, an effect to the second zone based on the attained second outcome wherein the effect includes unlocking a locked second quest;

(v) select, by the player via the game engine, a second one of the one or more non-locked second quests;

(w) place the Character, via the game engine, into a third one of the plural zones upon the player's completion of the predetermined one or ones of the one or more second quests;

(x) determine, via the game engine, an updated aggregate score for the player based on completed selected first and second quests; and (y) display, to the player, an indication of the updated aggregate score.

35. The non-transitory machine-readable medium of claim 33 wherein the first NPC and the second NPC are the same.

36. The non-transitory machine-readable medium of claim 33 wherein the number of first quests is different than the number of second quests.

37. A computer-implemented method for a narrative-driven role playing game to provide leadership training to a player, the method comprising the steps of:

(a) providing, by a game engine, a plurality of zones wherein a first one of the plural zones includes a first non-player character ("NPC") for interacting with a player character ("Character") controlled by a player, and wherein the first zone includes one or more first quests at least one of which is locked and not initially selectable by the player, and wherein the completion of a predetermined one or ones of the one or more first quests allows for the Character to proceed to a second one of the plurality of zones, and wherein the second one of the plural zones includes a second NPC for interacting with the Character controlled by the player, and wherein the second zone includes one or more second quests at least one of which is locked and not initially selectable by the player, and wherein the completion of a predetermined one or ones of the one or more second quests allows for the Character to proceed to a third one of the plurality of zones;

(b) providing, via the game engine, an entry of the Character into the first zone;

(c) selecting, by the player via the game engine, a first one of the one or more non-locked first quests;

(d) placing the Character, via the game engine, in the selected first quest;

(e) interacting, by the player via the game engine, in the selected first quest with the first NPC in a first set of narrative-driven dialogs each having a branching dialog tree, wherein a first dialog of the first set of dialogs includes a predetermined initial input by the first NPC and a first plurality of predetermined response options presented to the player wherein the first plurality of predetermined response options include a praise response, a coach response, and a scold response, wherein the player selects one of the first predetermined response options, and wherein a second dialog of the first set of dialogs includes a second input by the first NPC based on the first predetermined response option selected by the player in the first dialog of the first set of dialogs;

(f) attaining one of a predetermined number of first outcomes based on one or more responses selected by the player in the first set of narrative-driven dialogs, wherein one of the branching dialog trees in the first set of narrative-driven dialogs includes a first path having a first number of NPC interactions for attaining a first of the predetermined number of outcomes and a second path having a second number of NPC interactions for attaining the first of the predetermined number of outcomes;

(g) determining, via the game engine, a first quest score for the selected first quest wherein the first quest score is based on the first outcome attained;

(h) placing the Character, via the game engine, into the first zone;

(i) displaying to the player, via the game engine, an effect to the first zone based on the attained first outcome wherein the effect includes unlocking a locked first quest;

(j) selecting, by the player via the game engine, a second one of the one or more non-locked first quests;

(k) placing the Character, via the game engine, into a second one of the plural zones upon the player's completion of the predetermined one or ones of the one or more first quests;

(l) determining, via the game engine, an aggregate score for the player based on completed selected first quests;

(m) displaying, to the player, an indication of the aggregate score;

(n) unlocking, via the game engine, a game feature if the aggregate score is greater than a predetermined threshold;

(o) selecting, by the player via the game engine, a first one of the one or more non-locked second quests;

(p) placing the Character, via the game engine, in the selected second quest;

(q) interacting, by the player via the game engine, in the selected second quest with the second NPC in a second set of narrative-driven dialogs each having a branching dialog tree, wherein a first dialog of the second set of dialogs includes a predetermined initial input by the second NPC and a second plurality of predetermined response options presented to the player wherein the second plurality of predetermined response options include a praise response, a coach response, and a scold response, wherein the player selects one of the second predetermined response options, and wherein a second dialog of the second set of dialogs includes a second input by the second NPC based on the second predetermined response option selected by the player in the first dialog of the second set of dialogs;

(r) attaining one of a predetermined number of second outcomes based on one or more responses selected by the player in the second set of narrative-driven dialogs;

(s) determining, via the game engine, a score for the selected second quest wherein the score is based on the second outcome attained;

(t) placing the Character, via the game engine, into the second zone;

(u) displaying to the player, via the game engine, an effect to the second zone based on the attained second outcome wherein the effect includes unlocking a locked second quest;

(v) selecting, by the player via the game engine, a second one of the one or more non-locked second quests;

(w) placing the Character, via the game engine, into a third one of the plural zones upon the player's completion of the predetermined one or ones of the one or more second quests;

(x) determining, via the game engine, an updated aggregate score for the player based on completed selected first and second quests;

(y) displaying, to the player, an indication of the updated aggregate score; and (z) providing, via the game engine, coaching feedback to guide the player on decision making, based on performance by the player in the narrative-driven role playing game.

38. The method of claim 37 wherein the first plurality of predetermined response options equals three.

39. The method of claim 37 wherein the predetermined number of first outcomes equals three.

40. The method of claim 39 wherein the first quest score is a first predetermined score in response to the player attaining a first one of the first outcomes, a second predetermined score in response to the player attaining a second one of the first outcomes, or a third predetermined score the player attaining a third one of the first outcomes, wherein the first, second, and third predetermined scores are different.

41. The method of claim 40 wherein at least one of the first, second, and third predetermined scores is independent of a path through the branching dialog tree of the first set of narrative-driven dialogs.

42. The method of claim 40 wherein the aggregate score is determined based on a ratio of a total score received by the player for completed selected quests to a total possible score for the completed selected quests.

43. The method of claim 37 wherein the game feature provides the player, via the game engine, one of a plurality of buffs for use in a player-selected quest.

44. The method of claim 43 wherein the plurality of buffs are selected from the group consisting of: removing one of the plurality of predetermined response options for one of the dialogs in the first set of dialogs, automatically selecting one of the plurality of predetermined response options for one of the dialogs in the first set of dialogs; and placing the Character, via the game engine, into the first zone.

45. The method of claim 37 wherein the plurality of zones equals five.

46. The method of claim 37 wherein one of the one or more first quests is a non-scoring quest.

47. The method of claim 37 wherein the first NPC and the second NPC are the same.

48. The method of claim 37 wherein the number of first quests is different than the number of second quests.

49. A non-transitory machine-readable medium having stored thereon a plurality of executable instructions for a narrative-driven role playing game to provide leadership training to a player, the plurality of instructions comprising instructions to:

(a) provide, by a game engine, a plurality of zones wherein a first one of the plural zones includes a first non-player character ("NPC") for interacting with a player character ("Character") controlled by a player, and wherein the first zone includes one or more first quests at least one of which is locked and not initially selectable by the player, and wherein the completion of a predetermined one or ones of the one or more first quests allows for the Character to proceed to a second one of the plurality of zones, and wherein the second one of the plural zones includes a second NPC for interacting with the Character controlled by the player, and wherein the second zone includes one or more second quests at least one of which is locked and not initially selectable by the player, and wherein the completion of a predetermined one or ones of the one or more second quests allows for the Character to proceed to a third one of the plurality of zones;

(b) provide, via the game engine, an entry of the Character into the first zone;

(c) select, by the player via the game engine, a first one of the one or more non-locked first quests;

(d) place the Character, via the game engine, in the selected first quest;

(e) interact, by the player via the game engine, in the selected first quest with the first NPC in a first set of narrative-driven dialogs each having a branching dialog tree, wherein a first dialog of the first set of dialogs includes a predetermined initial input by the first NPC and a first plurality of predetermined response options presented to the player wherein the first plurality of predetermined response options include a praise response, a coach response, and a scold response, wherein the player selects one of the first predetermined response options, and wherein a second dialog of the first set of dialogs includes a second input by the first NPC based on the first predetermined response option selected by the player in the first dialog of the first set of dialogs;

(f) attain one of a predetermined number of first outcomes based on one or more responses selected by the player in the first set of narrative-driven dialogs, wherein one of the branching dialog trees in the first set of narrative-driven dialogs includes a first path having a first number of NPC interactions for attaining a first of the predetermined number of outcomes and a second path having a second number of NPC interactions for attaining the first of the predetermined number of outcomes;

(g) determine, via the game engine, a first quest score for the selected first quest wherein the first quest score is based on the first outcome attained;

(h) place the Character, via the game engine, into the first zone;

(i) display to the player, via the game engine, an effect to the first zone based on the attained first outcome wherein the effect includes unlocking a locked first quest;

(j) select, by the player via the game engine, a second one of the one or more non-locked first quests;

(k) place the Character, via the game engine, into a second one of the plural zones upon the player's completion of the predetermined one or ones of the one or more first quests;

(l) determine, via the game engine, an aggregate score for the player based on completed selected first quests;

(m) display, to the player, an indication of the aggregate score;

(n) unlock, via the game engine, a game feature if the aggregate score is greater than a predetermined threshold;

(o) select, by the player via the game engine, a first one of the one or more non-locked second quests;

(p) place the Character, via the game engine, in the selected second quest;

(q) interact, by the player via the game engine, in the selected second quest with the second NPC in a second set of narrative-driven dialogs each having a branching dialog tree, wherein a first dialog of the second set of dialogs includes a predetermined initial input by the second NPC and a second plurality of predetermined response options presented to the player wherein the second plurality of predetermined response options include a praise response, a coach response, and a scold response, wherein the player selects one of the second predetermined response options, and wherein a second dialog of the second set of dialogs includes a second input by the second NPC based on the second predetermined response option selected by the player in the first dialog of the second set of dialogs;

(r) attain one of a predetermined number of second outcomes based on one or more responses selected by the player in the second set of narrative-driven dialogs;

(s) determine, via the game engine, a score for the selected second quest wherein the score is based on the second outcome attained;

(t) place the Character, via the game engine, into the second zone;

(u) display to the player, via the game engine, an effect to the second zone based on the attained second outcome wherein the effect includes unlocking a locked second quest;

(v) select, by the player via the game engine, a second one of the one or more non-locked second quests;

(w) place the Character, via the game engine, into a third one of the plural zones upon the player's completion of the predetermined one or ones of the one or more second quests;

(x) determine, via the game engine, an updated aggregate score for the player based on completed selected first and second quests;

(y) display, to the player, an indication of the updated aggregate score; and (z) provide, via the game engine, coaching feedback to guide the player on decision making, based on performance by the player in the narrative-driven role playing game.

50. The non-transitory machine-readable medium of claim 49 wherein the first plurality of predetermined response options equals three.

51. The non-transitory machine-readable medium of claim 49 wherein the predetermined number of first outcomes equals three.

52. The non-transitory machine-readable medium of claim 51 wherein the first quest score is a first predetermined score in response to the player attaining a first one of the first outcomes, a second predetermined score in response to the player attaining a second one of the first outcomes, or a third predetermined score in response to the player attaining a third one of the first outcomes, wherein the first, second, and third predetermined scores are different.

53. The non-transitory machine-readable medium of claim 52 wherein at least one of the first, second, and third predetermined scores is independent of a path through the branching dialog tree of the first set of narrative-driven dialogs.

54. The non-transitory machine-readable medium of claim 52 wherein the aggregate score is determined based on a ratio of a total score received by the player for completed selected quests to a total possible score for the completed selected quests.

55. The non-transitory machine-readable medium of claim 49 wherein the game feature provides the player, via the game engine, one of a plurality of buffs for use in a player-selected quest.

56. The non-transitory machine-readable medium of claim 55 wherein the plurality of buffs are selected from the group consisting of: removing one of the plurality of predetermined response options for one of the dialogs in the first set of dialogs, automatically selecting one of the plurality of predetermined response options for one of the dialogs in the first set of dialogs; and placing the Character, via the game engine, into the first zone.

57. The non-transitory machine-readable medium of claim 49 wherein the plurality of zones equals five.

58. The non-transitory machine-readable medium of claim 49 wherein one of the one or more first quests is a non-scoring quest.

59. The non-transitory machine-readable medium of claim 49 wherein the first NPC and the second NPC are the same.

60. The non-transitory machine-readable medium of claim 49 wherein the number of first quests is different than the number of second quests.

* * * * *